United States Patent

[11] 3,547,366

| [72] | Inventors | Gerald F. Pickens;<br>Thomas G. Kirn, Rochester, N.Y. |
|---|---|---|
| [21] | Appl. No. | 801,412 |
| [22] | Filed | Feb. 24, 1969 |
| [45] | Patented | Dec. 15, 1970 |
| [73] | Assignee | Eastman Kodak Company<br>Rochester, N.Y.<br>a corporation of New Jersey |

[54] INTERCHANGEABLE SPINDLE ASSEMBLY
10 Claims, 4 Drawing Figs.

| [52] | U.S. Cl. | 242/68.3 |
|---|---|---|
| [51] | Int. Cl. | B65b 17/02 |
| [50] | Field of Search | 242/68.3 |

[56] References Cited
UNITED STATES PATENTS

| 3,326,489 | 6/1967 | Lessler | 242/68.3 |
|---|---|---|---|
| 3,347,485 | 10/1967 | Bundschuh | 242/68.3 |
| 3,375,995 | 4/1968 | Roman | 242/68.3 |

*Primary Examiner*—Nathan L. Mintz
*Attorneys*—Robert W. Hampton and G. Herman Childress ABSTRACT: A spindle assembly for movie projectors of the type adapted to handle both standard 8mm. film and super 8mm. film comprises two spindles of respectively different diameters, a rotatable socketlike member and cooperating means on the socket and on each spindle whereby either spindle may be readily engaged in, or removed from, the socket member.

PATENTED DEC 15 1970
3,547,366
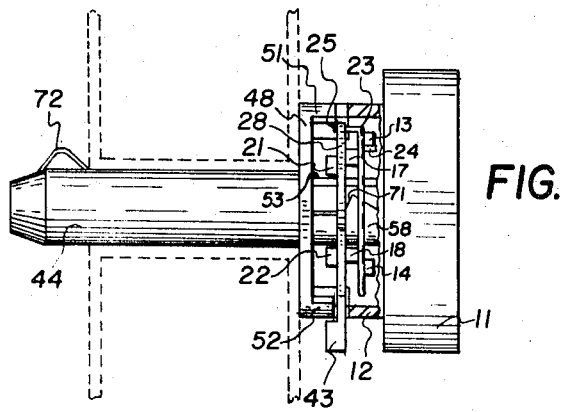
FIG. 1
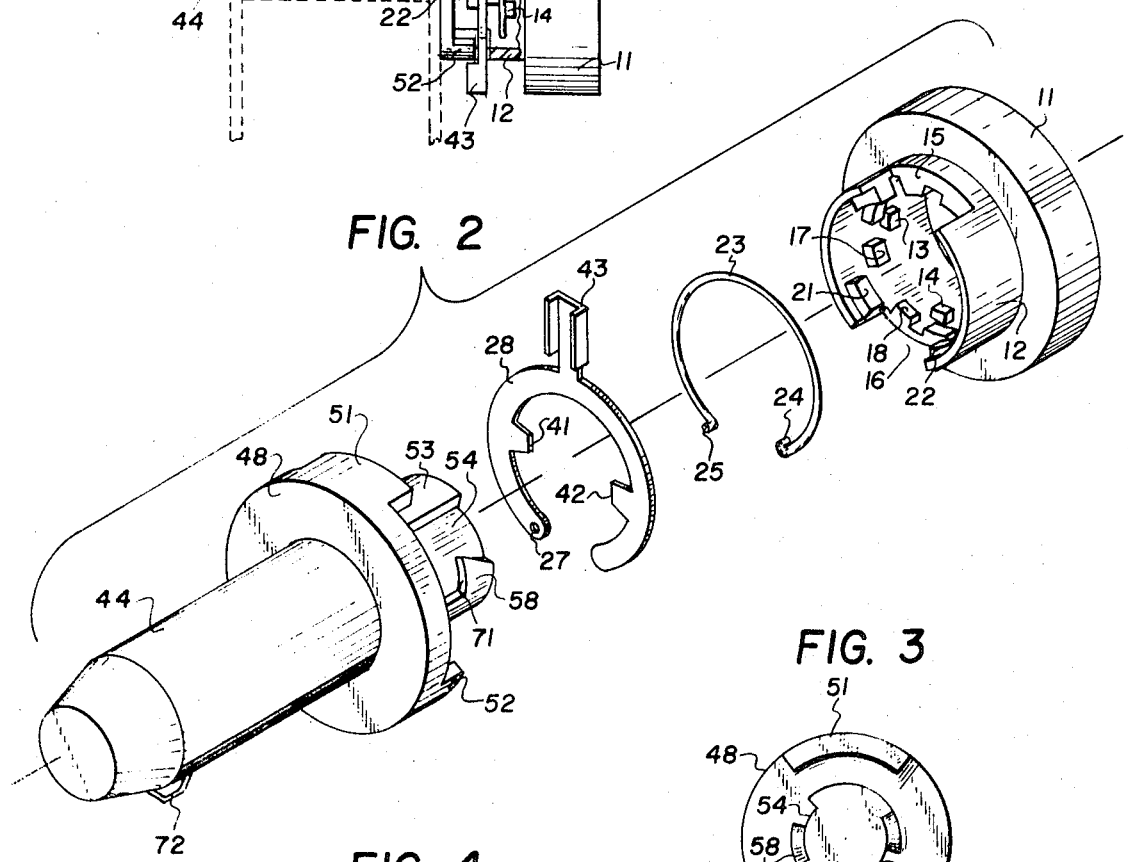
FIG. 2
FIG. 3
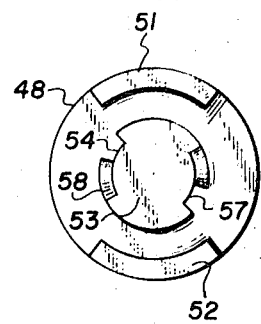
FIG. 4
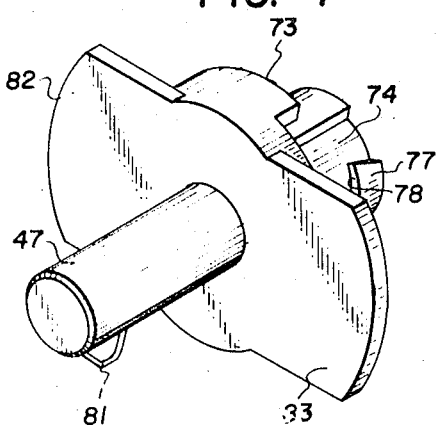
GERALD F. PICKENS
THOMAS G. KIRN
INVENTORS
BY J. Herman Childress
Robert W. Hampton
ATTORNEYS 3,547,366

INTERCHANGEABLE SPINDLE ASSEMBLY

BACKGROUND OF THE INVENTION

1. Field of the Invention

Our invention relates to a spindle assembly and more particularly to an interchangeable spindle assembly for motion picture projectors.

2. Description of the Prior Art

For many years a standard 8mm. film has been widely used in "home" motion picture projectors, and, more recently, a new "super 8 mm." film has been made available and is now also used quite widely. In order to forestall the inadvertent placement of a reel of super 8mm. film in a projector designed to use only standard 8mm. film, and vice versa, it is the practice to place the respective films on reels whose cores have respectively different inside diameters. Specifically, the reel for the super 8 film has a core diameter which is larger than the core diameter of the standard 8 film reel. Therefore, if a reel of super 8 film is placed in a projector designed for use with standard 8 film only, the error will be immediately apparent as the reel will move around on the spindle which is of a size to accommodate the smaller core. Further, if it be attempted to place a reel of standard 8 film in a projector designed for use with super 8 film, the attempt will fail as the core of the standard 8 film reel will not fit on the larger diameter spindle provided for use with super 8 film.

Motion picture projectors are available and are in common use, however, which are designed to selectively project both standard 8 film and super 8 film and it is necessary in this case, of course, to make some suitable provision for handling the two types of reels. To this end several different expedients have been proposed such, for example, as the adapters disclosed by commonly assigned U.S. Pat. No. 3,347,485 issued Oct. 17, 1967, to John J. Bundschuh and by commonly assigned U.S. Pat. No. 3,375,995 issued Apr. 2, 1968, to R. J. Roman. While many of these devices have performed quite satisfactorily, it is obvious that advantages would result by use of a simply constructed spindle designed to accept only the single intended type reel to be used in each instance.

SUMMARY OF THE INVENTION

Accordingly, it is an object of our invention to improve the performance of motion picture projectors of the type adapted to accommodate different sizes of reels.

A more specific object of our invention is to make feasible the interchangeability of different size spindles in a motion picture projector.

Another object of our invention is to prevent the inadvertent placement of a film cartridge on a spindle intended to receive film reels only.

In accordance with a specific illustrative embodiment of the invention these and other objects of the invention are accomplished by providing a socketlike member which is rotated by a projector drive mechanism. Separate spindles are provided, one of a diameter to accept a super 8 film reel and the other of a smaller diameter to accept only a standard 8 film reel. Thus, mounting and locking means permit either spindle to be readily inserted into and locked in the socket member, or removed therefrom, depending upon which type of reel is to be used in the projector at the moment. One of the spindles may be provided with wing portions which serve to prevent the positioning of a film cartridge on the spindle provided it be desired that the particular spindle accept film reels only.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which:

FIG. 1 is a side elevation of an assembly of this invention showing one size of the spindle in latched position in the driving socket as contemplated by a specific illustrative embodiment of the invention; the view being partially in section to show the locating splines and the positioning of the biasing spring and the lock ring;

FIG. 2 is an exploded perspective view of the assembly shown in FIG. 1;

FIG. 3 is an end view of the spindle shown in FIGS. 1 and 2; and

FIG. 4 is a perspective view of a second spindle generally similar to that shown in FIGS. 1 and 2 but of a smaller diameter to accept only standard 8mm. film reels.

DESCRIPTION OF THE PREFERRED EMBODIMENTS

Because motion picture projectors are well known, the present description will be directed in particular to elements forming part of, or cooperating more directly with, the present invention, motion picture projector elements not specifically shown or described herein being understood to be selectable from those known in the art.

Referring now to the drawings, and first to FIGS. 1 and 2, a socket member 11 is provided which is rotatably driven by suitable means, not shown, associated with the driving means of a motion picture projector of which the illustrated mechanism is intended to form a part. Member 11 is provided with an extended wall portion 12 which defines the socket proper and which is provided with cutout portions forming recesses 15 and 16 for a purpose to be described subsequently.

A series of retaining projections or splines are provided on the inner circumferential surface of wall portion 12, splines 13 and 14 being aligned vertically as are splines 17 and 18 and splines 21 and 22 respectively. It will be understood that additional splines may be provided and similarly aligned as required.

A wire spring 23, generally circular in shape, is placed in socket member 11 and is positioned between splines 13 and 14 on one side and between splines 17 and 18 on the other side. The spring is anchored at one end within socket member 11 by engagement spring end projection 24 with suitable means, such as an aperture, provided in wall 12, while projection 25 provided at the opposite extremity of spring 23 is positioned in aperture 27 provided at one end of lock ring 28; lock ring 28 is positioned in socket member 11 between retaining splines 17 and 18 on one side and retaining splines 21 and 1 22 on the opposite side. When spring member 23 is anchored at one end to socket member 11 and joined at the opposite end to lock ring 28, ring 28 is biased clockwise by spring 23 and is rotatable in a counterclockwise direction against the force of the spring. Radial projections 41 and 42 and finger lever 43 are provided on lock ring 28 for novel purposes which will be described subsequently.

As will be clear from subsequent detailed description, the novel arrangement contemplated by the invention is such that spindles of respective diameters to accommodate the two core sizes of super 8 and standard 8 film reels can be quickly and conveniently interchanged in the assembly according to the requirements of the user at the moment for a particular reel. Two spindles are shown, one spindle 44 (FIGS. 1 and 2) being of a diameter to accommodate a super 8 film reel or a film cartridge containing a super 8 film reel, and a second spindle 47 (FIG. 4) being of a smaller diameter to accommodate a standard 8 film reel with its smaller core.

So far as the steps involved in the positioning and locking of the spindles in the socket member, as well as the release of the spindles from their locked position, are concerned, the arrangement of the end structures of the spindles and the manipulations involved are the same and will be described in detail at this point with regard to spindle 44.

Collar 48 of the spindle unit is provided with projecting portions 51 and 52 of respective size and location to be encompassed by or received within the cutout portions forming recesses 15 and 16 in wall 12 of socket member 11 when the spindle unit is positioned in the socket member. Shaft 53 of the spindle unit is formed or cut away at two points or areas 180° apart on the circumference to provide grooves 54 and 57 each defined on one side by a curved ear portion and a straight following edge; ear portion 58 with its straight following edge 71 of groove 54 are shown in FIG. 2, and it will be understood that similar elements are provided at the opposite groove 57.

With spring 23 and lock ring 28 properly located in socket 11, it will now be assumed that the projector is to be used with a super 8 film reel, either alone or contained in a cartridge, and that, accordingly, spindle 44 will be used. The spindle unit is positioned in socket member 11 by axial movement of the spindle unit toward the socket with projecting members 51 and 52 properly aligned with recesses 15 and 16 respectively. As the spindle unit is inserted into socket member 11, the curved edges of ear 58 of groove 54 and the similar curved edge of the ear associated with the opposite groove 57 engage radial projections 42 and 41 respectively of lock ring 28; the resulting camming action as axial movement of the spindle unit continues causes counterclockwise rotation of lock ring 28 against the biasing force of spring 23. Rotation of socket member 11 with respect to the spindle unit is prevented at this point by the coupling of the two elements through engagement of projections 51 and 52 in the respective recesses 15 and 16; rotation of the two elements as a unitary assembly may, of course, take place.

As the manual axial insertion of the spindle unit into the socket continues, radial projections 42 and 41 progress along the camming surfaces of the respective ear portions until the end of the respective curved edge is reached, and the projections then drop into the respective recesses defined by the straight leading edge 71 associated with groove 54 and the similar leading edge associated with groove 57. The slight, but definite, clockwise rotation of lock ring 28 to position projections 42 and 41 in the respective recesses is assured by the biasing force of spring 23.

The engagement of radial projections 42 and 41 in the recesses behind the straight following edges of the respective ears is effective to lock the spindle unit in the socket with respect to axial movement; rotational coupling is provided by engagement of the projecting members 51 and 52 in the respective recesses 15 and 16.

According to one novel feature of our invention, means are provided for readily releasing the spindle unit from its locked position in the assembly. For this purpose, lock ring 28 is provided with a projecting finger lever 43 by which the ring can be manually rotated in a counterclockwise direction against the biasing action of spring 23; this action is effective to move projections 42 and 41 out of the respective recesses in shaft 53 after which the spindle unit can be withdrawn axially from socket 11.

As pointed out above, the diameter of spindle 44 is of the exact dimension to properly accommodate a super 8mm. film reel or a cartridge containing such a reel. Location of the reel on the spindle is indicated by dotted lines in FIG. 1. Conventional means may be provided for holding the reel in position on the spindle. For example, a retractable spring 72 of the general nature shown in U.S. Pat. No. 3,375,995 referred to above may be utilized for the purpose. It will be clear that the novel arrangement provided permits proper attachment of the exact size spindle to the rotatable socket easily and without tools of any sort. Positive drive coupling is afforded by engagement of the projections on the spindle unit with the respective recesses in the socket member, while the spindle is positively locked against axial withdrawal by the engagement of the lock ring radial projections in the respective recesses of the spindle unit shaft. However, the spindle can be readily released when desired by a simple finger manipulation of the lock ring by virtue of the projecting lever 43.

The novel arrangement contemplated affords the advantageous feature that spindles of the exact size to accommodate a particular reel may be readily and positively positioned in the socket, and to this end the second spindle 47 shown in FIG. 4 is of generally similar arrangement to that described above. In this instance, however, the diameter of the spindle itself, that is spindle 47, is of the exact dimension to accept standard 8mm. film reels. The shaft arrangement is the same as that previously described; the hub is provided with two projecting portions, projection 73 being shown and the other being on the opposite side of the hub. Two grooves, each with a curved, camming forward edge and a straight following edge, are provided as in the spindle unit of FIG. 2; groove 74 with ear portion 77 and straight edge 78 are shown and it will be understood that the companion groove is located 180° around the hub circumference. The spindle unit of FIG. 4 is positioned in and removed from the socket member 11 in exactly the same easy manner described above with reference to spindle 44. In this instance, also, conventional means, such as retractable spring 81, may be provided on the spindle whereby to hold the reel in position thereon.

As described above, spindle 44 is adapted to receive either a film cartridge containing a super 8 reel or a super 8 film reel alone. It may be desirable that a spindle accept a film reel only and not a cartridge containing a reel, and it is assumed for purposes of further description that it is so desired with regard to spindle 47, that is that the spindle accept a standard 8mm. film reel but that it reject a film cartridge even when containing a standard 8mm. film reel. Accordingly, wing portions 82 and 83 are provided on the spindle unit adjacent to the hub. These wing portions prevent by interference the acceptance by spindle 47 of a film cartridge but do not interfere in any way with the placement of a film reel of the proper type thereon. It will be understood, of course, that the wings may be omitted from the spindle unit when their function is not required, and that they may be used with the other size spindle if so desired.

Obvious advantages result, of course, particularly in the instance of a "home" projector, from provision of the novel arrangement contemplated by our invention, making it possible as it does for even inexperienced users to quickly and easily position the proper spindle in the projector without the use of tools of any sort and without the necessary application of any particular mechanical ingenuity. The spindle is firmly locked in rotatable position and yet, on occasion, may be readily released and removed, again without tools or exercise of mechanical skill. The novel arrangement of the lock ring, rotatable in either direction within limits, in conjunction with the wire spring for biasing the ring, contributes to attainment of the resulting efficient functioning of the assembly.

The invention has been described in detail with particular reference to preferred embodiments thereof, but it will be understood that variations and modifications can be effected within the spirit and scope of the invention.

We claim:

1. A spindle assembly for selectively accommodating two film reels whose cores have different internal diameters, the assembly comprising:

a first spindle of a diameter to accommodate the core of the first said reels, a second spindle of a larger diameter to accommodate the core of the second of said reels;

a rotatable socket member; and cooperating means on said socket member and on each of said spindles whereby partial axial insertion of either of said spindles as selected into the socket will positively couple the selected spindle and the socket for simultaneous rotational movement and further axial insertion of the spindle will lock the spindle against inadvertent axial withdrawal from said socket.

2. A spindle assembly as set forth in claim 1 further comprising means integrally associated with said first spindle for preventing the positioning of a film cartridge thereon without interfering with the proper positioning of a film reel thereon.

3. A spindle assembly as set forth in claim 2 wherein said preventing means comprises wing members extending laterally from the spindle, said wing members being of a size and shape to prevent by interference the positioning of a film cartridge on said spindle.

4. A spindle assembly as set forth in claim 1 further comprising manually operable means for releasing the spindle from the socket to allow axial withdrawal of the spindle from the socket.

5. A spindle assembly as set forth in claim 4 further comprising a projecting wall on said socket member, said wall having cutout portions therein thereby to define recesses in the wall, each of said spindles having projections comparable in size and number to the recesses in said wall whereby said projections can be positioned in the recesses upon partial axial insertion of a selected spindle in said socket and engagement of said projections in the recesses is effective to prevent relative rotational movement of the selected spindle and the socket member and thereby to provide positive rotational coupling of the selected spindle and the socket member as a unit.

6. A spindle assemble as set forth in claim 5 wherein said cooperating means on said socket member includes a lock ring rotatable within limits in opposite directions and a spring for biasing said lock ring in one direction, and said cooperating means further comprises means on each of said spindles effective upon partial axial insertion of a selected spindle in the socket member to cause rotation of said lock ring in a direction against the biasing action of said spring and effective upon further axial insertion of said selected spindle to permit limited return rotation of said lock ring under the force of said spring to lock said spindle in said socket member against axial withdrawal.

7. A spindle assembly as set forth in claim 6 wherein each of said spindles has axial grooves in their respective hub portions located substantially 180° apart circumferentially, said lock ring has radial projections adapted to be positioned respectively in said axial grooves upon partial axial insertion of a selected spindle in said socket member, and each of said spindles has an ear member defining one side of the respective groove in each hub portion, each ear member having a curved forward edge and a straight following edge, engagement of the respective axial projections on the ring with the curved edges on the ears of the selected spindle being effective upon continued axial insertion of the selected spindle into the socket to cause rotation of said lock ring against the biasing force of said spring.

8. A spindle assembly as set forth in claim 7 wherein additional axial insertion of the selected spindle is effective to engage the respective radial projections of the ring with the respective straight following edges of the associated ear members on the selected spindle, such engagement being effective to permit sufficient rotation of the lock ring under the force of the spring to position the respective axial projections adjacent the straight leading edges thereby to lock the selected spindle against axial withdrawal from said socket member.

9. A spindle assembly as set forth in claim 8 wherein said lock ring has a projecting lever for facilitating manual counterclockwise rotation of said lock ring against the biasing force of said spring thereby to withdraw said radial projections from the respective recesses and release the selected spindle for axial withdrawal from said socket.

10. A spindle assembly for accommodating reels for strips of web material, the assembly comprising:
   a rotatable socket member having a recess therein;
   a spindle member adapted to be rotated by said socket member, the spindle member having a projecting portion adapted to be received in the recess in the socket member during assembly of the spindle member onto the socket member for coupling the spindle member to the socket member for simultaneous rotational movement of the socket member and the spindle member;
   a lock member adapted to engage a portion of said spindle member for preventing inadvertent disassembly of the spindle member from the socket member; and
   a spring member operatively connected to the socket member and to the lock member for biasing the spindle member in a direction to engage the lock member with the portion of said spindle member to maintain the spindle member in assembled relation with the socket member.